US011792505B2

(12) United States Patent
Feng et al.

(10) Patent No.: US 11,792,505 B2
(45) Date of Patent: Oct. 17, 2023

(54) ENHANCED OBJECT DETECTION

(71) Applicant: QUALCOMM Incorporated, San Diego, CA (US)

(72) Inventors: Wen-Chun Feng, New Taipei (TW); Yu-Ren Lai, Nantou County (TW); Hsin Yueh Chang, Zhubei (TW)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/591,503

(22) Filed: Feb. 2, 2022

(65) Prior Publication Data
US 2023/0011950 A1 Jan. 12, 2023

Related U.S. Application Data

(60) Provisional application No. 63/219,290, filed on Jul. 7, 2021, provisional application No. 63/218,873, filed on Jul. 6, 2021.

(51) Int. Cl.
H04N 23/60 (2023.01)
G06V 10/25 (2022.01)
G06V 40/16 (2022.01)

(52) U.S. Cl.
CPC ............ H04N 23/64 (2023.01); G06V 10/25 (2022.01); G06V 40/166 (2022.01)

(58) Field of Classification Search
CPC ....... H04N 23/64; G06V 10/25; G06V 40/166
See application file for complete search history.

(56) References Cited

U.S. PATENT DOCUMENTS

| 8,134,604 | B2* | 3/2012 | Fujita | H04N 23/682 |
| | | | | 348/208.6 |
| 11,153,501 | B1* | 10/2021 | Cooper | H04N 23/72 |
| 2008/0300010 | A1 | 12/2008 | Border et al. | |
| 2011/0149094 | A1* | 6/2011 | Chen | H04N 23/6815 |
| | | | | 348/E5.022 |
| 2012/0033100 | A1* | 2/2012 | Harikae | H04N 5/2628 |
| | | | | 348/222.1 |
| 2013/0129145 | A1* | 5/2013 | Ye | G06V 30/142 |
| | | | | 382/103 |
| 2014/0226864 | A1* | 8/2014 | Venkatraman | G01C 21/20 |
| | | | | 382/107 |

FOREIGN PATENT DOCUMENTS

JP 2007243241 A 9/2007

OTHER PUBLICATIONS

International Search Report and Written Opinion—PCT/US2022/027332—ISA/EPO—dated Aug. 17, 2022.

* cited by examiner

Primary Examiner — Ahmed A Berhan
(74) Attorney, Agent, or Firm — Polsinelli/Qualcomm

(57) ABSTRACT

Systems and techniques are provided for processing image data. According to some aspects, a process can include obtaining a frame captured using an image sensor of a device. The process can include detecting an orientation of the device using a position sensor. The process can further include determining, based on the orientation, a transform to be applied to a region of interest in the frame. The process can include applying the transform to the region of interest. The process can further include providing the transformed region of interest to the object detection algorithm.

30 Claims, 19 Drawing Sheets

No tilt

Estimate z-tilt angle θ by z-axis
(e.g., acceleration force)/(Max acceleration (9.8 m/s$^2$))

ENHANCED OBJECT DETECTION

CROSS-REFERENCE TO RELATED APPLICATIONS

The present application claims the benefit of U.S. Provisional Application No. 63/218,873, filed Jul. 6, 2021, entitled "ANGLE CORRECTION FOR IMPROVED IMAGE CAPTURE AND/OR PROCESSING OPERATIONS." The present application also claims the benefit of U.S. Provisional Application No. 63/219,290, filed Jul. 7, 2021, entitled "ANGLE CORRECTION FOR IMPROVED IMAGE CAPTURE AND/OR PROCESSING OPERATIONS." Both of the foregoing provisional applications are hereby incorporated by reference in their entirety and for all purposes.

FIELD

This application is related to image processing and/or capture. In some examples, aspects of the application relate to systems and techniques for performing angle correction for providing improved image processing and/or image capturing operations performed on image data for enhanced object detection.

BACKGROUND

Cameras can be configured with a variety of image capture and image processing settings to alter the appearance of an image. Some image processing operations are determined and applied before or during capture of the photograph, such as auto-focus, auto-exposure, and auto-white-balance operations. These operations are configured to correct and/or alter one or more regions of an image (for example, to ensure the content of the regions is not blurry, over-exposed, or out-of-focus). The operations may be performed automatically by an image processing system or in response to user input. More advanced and accurate image processing techniques are needed to improve the output of image processing operations.

SUMMARY

Systems and techniques are described herein for performing angle correction for providing improved image processing and/or image capturing operations (e.g., automatic-focus, automatic-exposure, automatic-white balance, and/or other image capture or processing operations) performed on image data. According to one illustrative example, a method of processing image data is provided. The method includes: obtaining a frame captured using an image sensor of a device; detecting an orientation of the device using a position sensor; determining, based on the orientation, a transform to be applied to a region of interest in the frame; generating a transformed region of interest at least in part by applying the transform to the region of interest; and performing object detection using the transformed region of interest.

In another example, an apparatus for processing image data is provided that includes at least one memory and at least one processor (e.g., implemented in circuitry) coupled to the at least one memory. The at least processor is configured to: obtain a frame captured using an image sensor of a device; detect an orientation of the device using a position sensor; determine, based on the orientation, a transform to be applied to a region of interest in the frame; generate a transformed region of interest at least in part by applying the transform to the region of interest; and perform object detection using the transformed region of interest. In some cases, the apparatus includes the image sensor. In some aspects, the apparatus is the device (i.e., the apparatus and the device are the same device). In some aspects, the apparatus is part of the device (e.g., the apparatus is a component, such as a chipset, of the apparatus). In some aspects, the apparatus is separate from the device. In such aspects, the at least one processor can be configured to receive the frame from the device.

In another example, a non-transitory computer-readable medium is provided that has stored thereon instructions that, when executed by one or more processors, cause the one or more processor to: obtain a frame captured using an image sensor of a device; detect an orientation of the device using a position sensor; determine, based on the orientation, a transform to be applied to a region of interest in the frame; generate a transformed region of interest at least in part by applying the transform to the region of interest; and perform object detection using the transformed region of interest.

In another example, an apparatus for processing image data is provided. The apparatus includes: means for obtaining a frame captured using an image sensor of a device; means for detecting an orientation of the device using a position sensor; means for determining, based on the orientation, a transform to be applied to a region of interest in the frame; means for generating a transformed region of interest at least in part by applying the transform to the region of interest; and means for performing object detection using the transformed region of interest.

In some aspects, the region of interest comprises a facial region. In some cases, performing the object detection includes performing face detection to identify a face in the transformed region of interest.

In some aspects, to detect the orientation of the device using the position sensor, the method, apparatuses, and computer-readable medium described above can include: identifying a point of interest in the frame; detecting a first rotation on a pitch axis based on a difference between the point of interest and a pitch of the device; and detecting a second rotation on a roll axis based on a difference between the point of interest and a rotation of the device.

In some aspects, the transform is determined to be applied to the region of interest when at least one of the first rotation on the pitch axis is greater than a first threshold value from a pitch axis origin and when the second rotation on the roll axis is greater than a second threshold value from a roll axis origin.

In some aspects, when the first rotation on the pitch axis is greater than the first threshold value and the second rotation on the roll axis is less than the second threshold value, the transform includes a perspective transform of at least the region of interest in the frame.

In some aspects, when the first rotation on the pitch axis is less than the first threshold value and the second rotation on the roll axis is greater than the second threshold value, the transform includes a rotation of at least the region of interest in the frame.

In some aspects, when the first rotation on the pitch axis is greater than the first threshold value and the second rotation on the roll axis is greater than the second threshold value, the transform includes a rotation of at least the region of interest in the frame and a perspective transform of at least the region of interest in the frame.

In some aspects, wherein the first threshold value comprises 30 degrees. In some aspects, the second threshold value comprises 5 degrees.

In some aspects, the region of interest in the frame corresponds to an object. In such aspects, the method, apparatuses, and computer-readable medium described above can include: detecting the object based on performing the object detection using the transformed region of interest.

In some aspects, the method, apparatuses, and computer-readable medium described above can include: performing at least one of auto-exposure, auto-focus, and auto-white-balance on the region of interest of the frame.

In some aspects, the position sensor comprises an accelerometer.

In some aspects, the position sensor comprises a gyroscope.

In some aspects, the method, apparatuses, and computer-readable medium described above can include: identifying the region of interest for identification of an object.

In some aspects, the method, apparatuses, and computer-readable medium described above can include capturing the frame using the image sensor.

In some aspects, one or more of the apparatuses described above is or is part of a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a vehicle (e.g., a computing device of a vehicle), or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
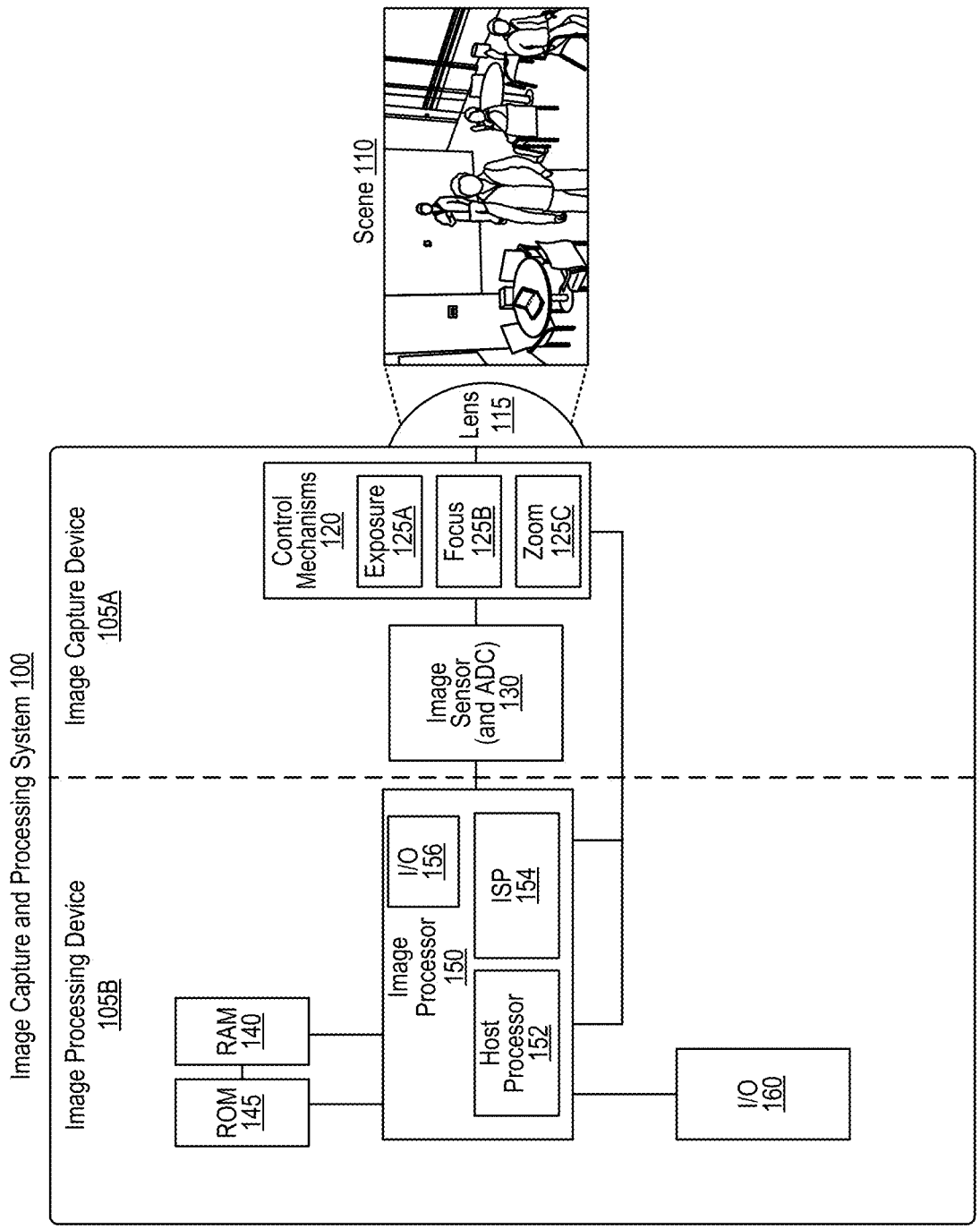
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras may include processors, such as image signal processors (ISPs), that can receive one or more image frames and process the one or more image frames. For example, a raw image frame captured by a camera sensor can be processed by an ISP to generate a final image. Processing by the ISP can be performed by a plurality of filters or processing blocks being applied to the captured image frame, such as denoising or noise filtering, edge enhancement, color balancing, contrast, intensity adjustment (such as darkening or lightening), tone adjustment, among others. Image processing blocks or modules may include lens/sensor noise correction, Bayer filters, de-mosaicing, color conversion, correction or enhancement/suppression of image attributes, denoising filters, sharpening filters, among others.

Cameras can be configured with a variety of image capture and image processing operations and settings. The different settings result in images with different appearances. Some camera operations are determined and applied before or during capture of the photograph, such as auto-focus, auto-exposure, and auto-white-balance algorithms (collectively referred to as the "3As"). Additional camera operations applied before or during capture of a photograph include operations involving ISO, aperture size, f/stop, shutter speed, and gain. Other camera operations can configure post-processing of a photograph, such as alterations to contrast, brightness, saturation, sharpness, levels, curves, or colors.

A camera system can implement an object detection algorithm for various purposes. In some cameras, a detected object (e.g., a face, a vehicle, or other object) is a salient region in an image of a scene. The region of the image corresponding to the detected object (e.g., the facial region) may be selected as a "region of interest" (ROI) for image capture or processing operations (e.g., auto-focus, auto-exposure, auto-white-balance, auto-zoom, etc.). Accordingly, an inconsistent object detection ROI (e.g., an ROI corresponding to a detected face) in one or more frames (e.g., in sequential frames of a video) may influence the performance of image capture or processing operations (e.g., auto-focus, auto-exposure, etc.), such as by causing the operations to lose the target object. For instance, if a ROI is determined for a region of an image other than a region that includes an object of interest (e.g., a face, a vehicle, etc.), the image capture or processing operations may be performed for an incorrect region of the image (e.g., resulting in the target object in an image being unfocused while a region of the image that is of less importance being focused).

Object detection algorithms (e.g., face detection algorithms) may require significant computation complexity that incurs a processing delay, which may also be referred to as latency. Faster algorithms may incur less latency, but detection can be unstable over time as the image moves and is not directly aligned with the camera system. This issue can be resolved with more complex detection algorithms. However, with a complex detection algorithm, there can be a large delay for each frame and the algorithm requires more intensive processor operations. Such latency versus accuracy is depicted in the graph 1100 of FIG. 11.

Accordingly, systems, apparatuses, processes (also referred to as methods), and computer-readable media (collectively referred to as "systems and techniques") are described herein for improving the quality and/or efficiency of image processing operations. For instance, in some examples, the systems and techniques can implement image processing to preprocess a region to improve an object detection algorithm (e.g., a facial detection algorithm, a vehicle detection algorithm, or other object detection algorithm).

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties. In some cases, the one or more control mechanisms 120 may control and/or implement "3A" image processing operations.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the device 105A, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1210 discussed with respect to the computing system 1200. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1220, read-only memory (ROM) 145/1225, a cache 1212, a memory unit 1215, another storage device 1230, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1235, any other input devices 1245, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the device 105B and one or more peripheral devices, over which the device 105B may receive data from the one or more peripheral device and/or transmit data to the one or more peripheral devices. The I/O 160 may include one or more wireless transceivers that enable a wireless connection between the device 105B and one or more peripheral devices, over which the device 105B may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

The host processor 152 can configure the image sensor 130 with new parameter settings (e.g., via an external control interface such as I2C, I3C, SPI, GPIO, and/or other interface). In one illustrative example, the host processor 152 can update exposure settings used by the image sensor 130 based on internal processing results of an exposure control algorithm from past image frames. The host processor 152 can also dynamically configure the parameter settings of the internal pipelines or modules of the ISP 154 to match the settings of one or more input image frames from the image sensor 130 so that the image data is correctly processed by the ISP 154. Processing (or pipeline) blocks or modules of the ISP 154 can include modules for lens/sensor noise correction, de-mosaicing, color conversion, correction or enhancement/suppression of image attributes, denoising filters, sharpening filters, among others. The settings of different modules of the ISP 154 can be configured by the host processor 152. Each module may include a large number of tunable parameter settings. Additionally, modules may be co-dependent as different modules may affect similar aspects of an image. For example, denoising and texture correction or enhancement may both affect high frequency aspects of an image. As a result, a large number of parameters are used by an ISP to generate a final image from a captured raw image.

In some cases, the image capture and processing system 100 may perform one or more of the image processing functionalities described above automatically. For instance, one or more of the control mechanisms 120 may be configured to perform auto-focus operations, auto-exposure operations, and/or auto-white-balance operations (referred to as the "3As," as noted above). In some embodiments, an auto-focus functionality allows the image capture device 105A to focus automatically prior to capturing the desired image. Various auto-focus technologies exist. For instance, active autofocus technologies determine a range between a camera and a subject of the image via a range sensor of the camera, typically by emitting infrared lasers or ultrasound signals and receiving reflections of those signals. In addition, passive auto-focus technologies use a camera's own image sensor to focus the camera, and thus do not require additional sensors to be integrated into the camera. Passive AF techniques include Contrast Detection Auto Focus (CDAF), Phase Detection Auto Focus (PDAF), and in some cases hybrid systems that use both. The image capture and processing system 100 may be equipped with these or any additional type of auto-focus technology.

Figure 2A:
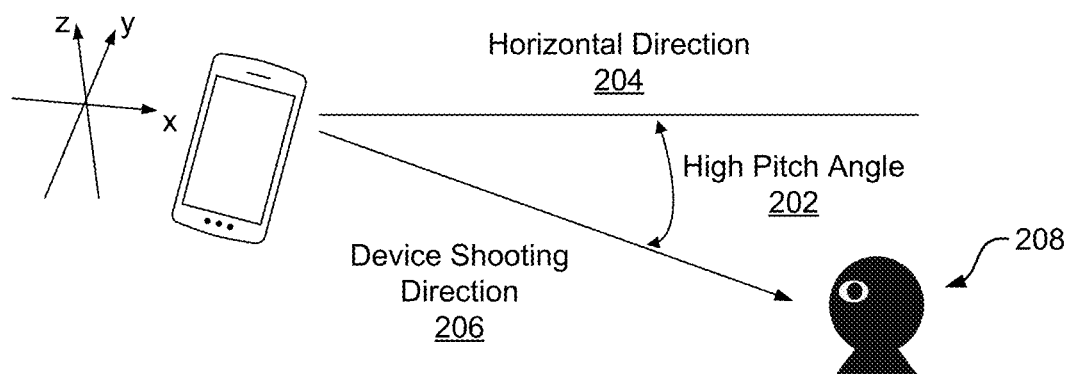
FIG. 2A and FIG. 2B are diagrams illustrating an image capture operation, in accordance with some examples.
Figure 2B:
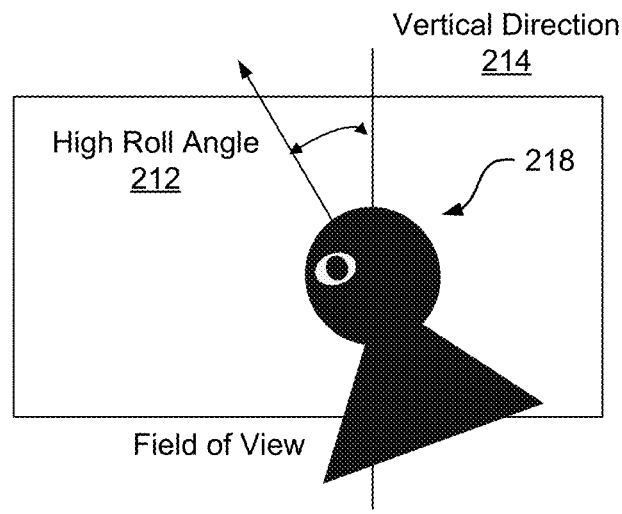

FIG. 2A illustrates a device including an image capture and processing system (e.g., the image capture and processing system 100). As shown, the device is being rotated along a pitch axis at a high pitch angle 202, such as greater than 30°, relative to a horizontal direction 204 and a shooting direction 206 of the device due to a subject 208 of an image capture operation being beneath the image capture and processing system when an image is captured by the image capture and processing system. FIG. 2B illustrates a device including an image capture and processing system being rotated along a roll axis at a high roll angle 212, such as greater than 25°, relative to a vertical direction 214 due to the device being rotated when capturing an image of a subject 218. For example, FIG. 2B may illustrate an image preview that is displayed in a display or viewfinder of the device. Because the person capturing the image is rotating the image capture and processing system 100 to their right side, the subject 218 of the image appears crooked in the display.

Figure 2C:
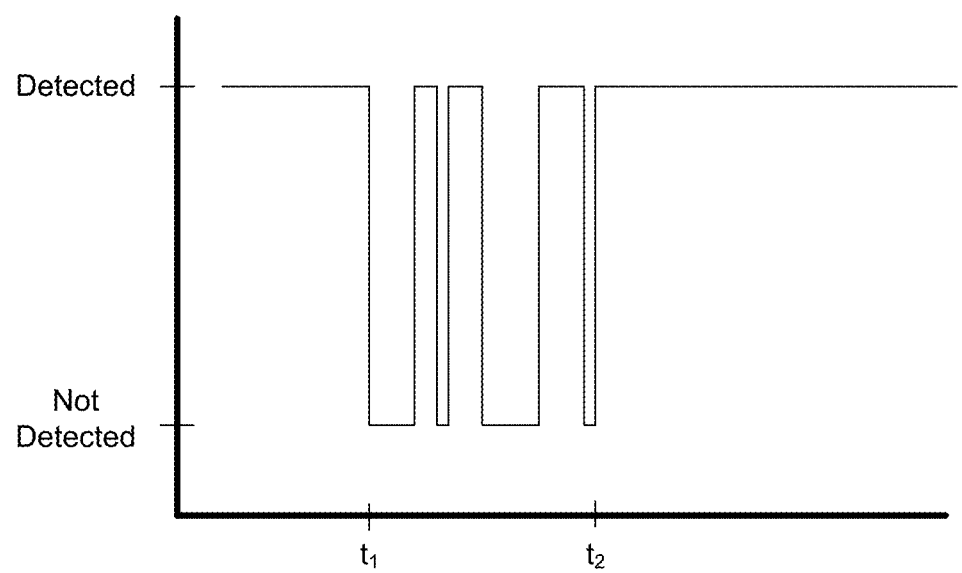
FIG. 2C illustrates an object detection result that occurs during an image capture operation, in accordance with some examples.

FIG. 2C illustrates an object detection result of the image capture and processing system 100. For instance, for a period of time between $t_1$ and $t_2$, the object detection algorithm cannot properly detect the object in an ROI of an image. As shown in FIG. 2C, the detection of the object during the period of time between $t_1$ and $t_2$ is unstable. In particular, the object detection result frequently goes from detecting the object to not detecting the object during the period of time between $t_1$ and $t_2$.

Figures 3A, 3B:
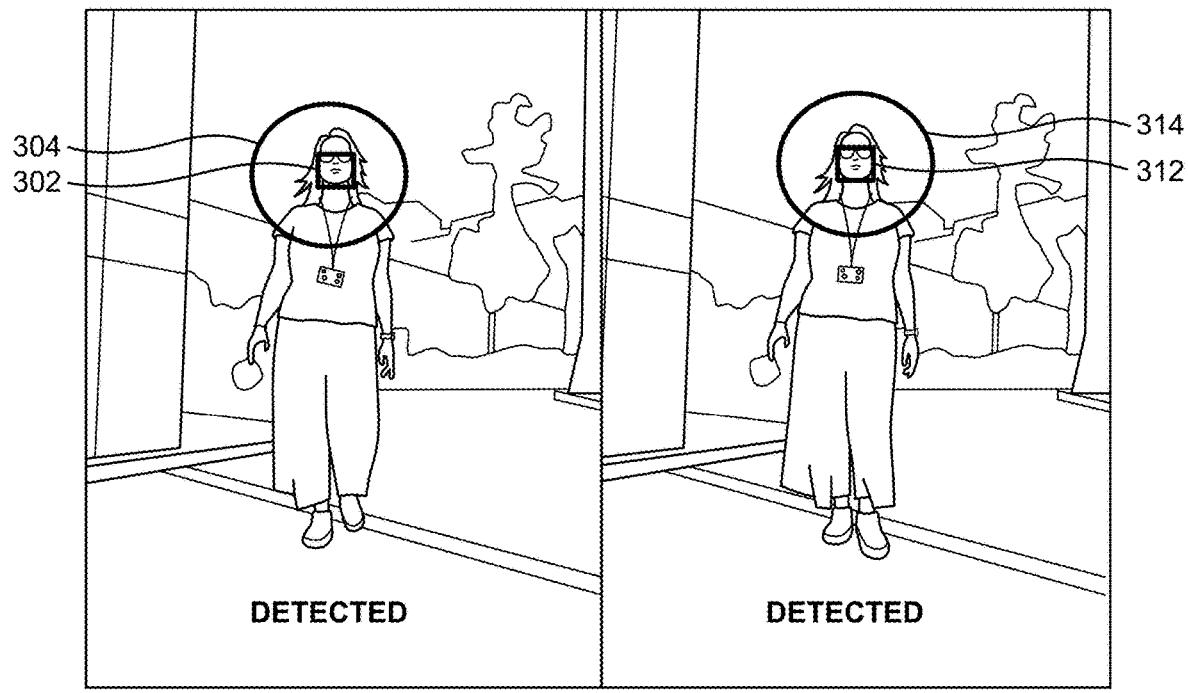
FIG. 3A, FIG. 3B, FIG. 3C, and FIG. 3D are example frames illustrating image capture operations, in accordance with some examples.

FIG. 3A, FIG. 3B, FIG. 3C, and FIG. 3D illustrate an example of image frames that may be captured and/or processed while the image capture and processing system 100 performs one or more image processing operations, such as a "3A" operation (e.g., auto-focus, auto-exposure, or auto-white-balance) and/or other operations (e.g., auto-zoom). For instance, FIG. 3A illustrates a person approaching a device including an image capture and processing system (e.g., the image capture and processing system 100). As shown in FIG. 3A, a face region 302 (represented by a bounding box) is accurately detected. Accordingly, region 304 is determined to be an ROI for the one or more image processing operations to improve the image capture.

Figures 3C, 3D:
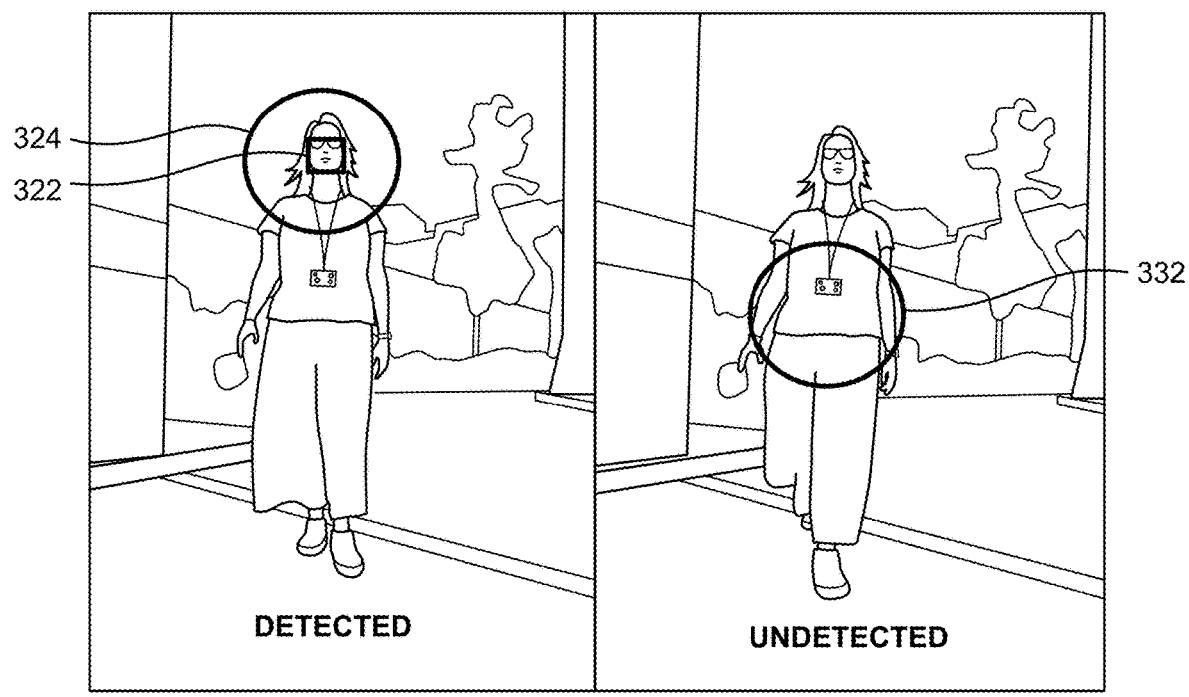

FIG. 3B illustrates that the person is placing their left foot down and a face region 312 (represented by a bounding box) is accurately detected. Accordingly, region 314 is determined to be the ROI for the one or more image processing operations to improve the image capture. FIG. 3C illustrates that the person's left foot is making contact with the ground surface and a face region 322 (represented by a bounding box) is accurately detected, resulting in the region 324 being determined as the ROI.

FIG. 3D illustrates that the person's left foot is in full contact with the ground surface, but the person's face cannot be identified (e.g., based on a pitch angle of the face relative to the device being greater than a pitch threshold, such as 30° relative to a horizontal direction or plane). As a result, the image capture and processing system is unable to identify a specific ROI. In such cases, the image capture and processing system may assume a center region 332 corresponds to the ROI. As a result, the image frame illustrated in FIG. 3D will have a different region used for the one or more image processing operations as compared to the sequence of image frames in FIG. 3A, FIG. 3B, and FIG. 3C, which may affect visual fidelity of the captured frames. For instance, the face of the person in the image frame of FIG. 3D may be blurry, while the face of the person in the image frames of FIG. 3A, FIG. 3B, and FIG. 3C may be in focus due to an auto-focus operation being performed for the regions 304, 314, and 324, respectively.

Figure 4:
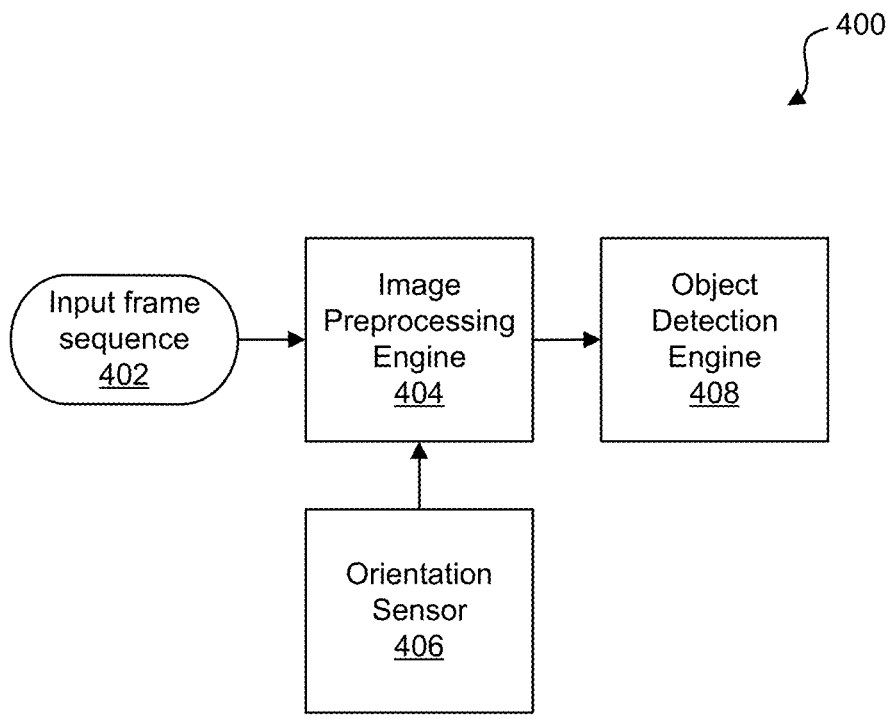
FIG. 4 is a block diagram illustrating an example of an image capture and processing system, in accordance with some examples.

FIG. 4 is a block diagram illustrating an example of an image capture and processing system 400. In some aspects, the image capture and processing system 400 is configured to improve image processing operations, such as the operations illustrated in FIG. 3A, FIG. 3B, FIG. 3C, and FIG. 3D. The image capture and processing system 400 may include one or more of the components of the image capture and processing system 100 shown in FIG. 1, including the image capture device 105A, the image processing device 105B, the lens 115, and/or other components of the image capture and processing system 100. In some cases, all or a portion of the components of the image capture and processing system 400 may be implemented within a computing device. The device can include any suitable device, such as a mobile device (e.g., a mobile phone), a desktop computing device, a tablet computing device, an extended reality (XR) device (e.g., a virtual reality (VR) headset, an augmented reality (AR) headset, AR glasses, or other XR device), a wearable device (e.g., a network-connected watch or smartwatch, or other wearable device), a server computer, a vehicle (e.g., an autonomous or semi-autonomous vehicle) or computing device of an autonomous vehicle, a robotic device, a television, and/or any other computing device with the resource capabilities to perform the image processing operations described herein.

An input frame sequence 402 is provided as input to an image preprocessing engine 404 of the image capture and processing system 400. In some cases, the image capture and processing system 400 captures the input frame sequence 402. In some cases, the image capture and processing system 400 provides the input frame sequence 402 as input from another device or image source. An example of an input frame sequence is illustrated in FIG. 3A, FIG. 3B, FIG. 3C, and FIG. 3D, above.

The image preprocessing engine 404 may also receive orientation information from an orientation sensor 406. The orientation sensor 406 can include a motion sensor such as an accelerometer that detects motion in three dimensions, a gyroscope sensor, or any other suitable sensor. In some examples, the orientation sensor 406 can be a combination of sensors (e.g., accelerometer and gyroscope sensor). Using the orientation information, the image preprocessing engine 404 may apply a transformation to the input frame sequence 402 to alter pixels of one or more image frames from the input frame sequence 402. As an example, if the orientation information indicates that the image capture and processing system 400 is rotated, the image preprocessing engine 404 may determine to distort an image frame based on a rotation amount to orient the content in the image frames. The one or more image frames are provided to an object detection engine 408 for object detection. For example, the object detection engine 408 may implement a face detection algorithm and/or other object detection algorithm (e.g., a vehicle detection or classification algorithm, etc.). In one illustrative example using a face as an example of an object, by orienting a person's face so that the facial features (e.g., eyes, nose, mouth) are positioned and oriented in their expected location (e.g., facing an image sensor or camera of the image capture and processing system 400), the object detection engine 408 can improve the quality and consistency of the face detection algorithm used by the object detection engine 408.

Figure 5:
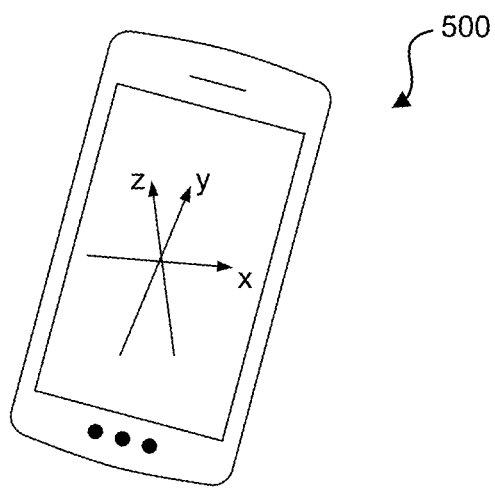
FIG. 5 is a diagram illustrating a device including an image capture and processing system rotating along at least axis, in accordance with some examples.

FIG. 5 illustrates an example mobile device 500 that can implement or include the image capture and processing system 400. Because the mobile device 500 is a portable device that can be oriented in any direction, the mobile device 500 can be rotated along one or more axes (e.g., a roll axis corresponding to the Z axis such that the roll angle is rotated along the Z axis, a pitch axis corresponding to the X axis such that the pitch angle is rotated along the X axis, and a yaw axis corresponding to the Y axis such that the yaw angle is rotated along the Y axis).

Figure 6:
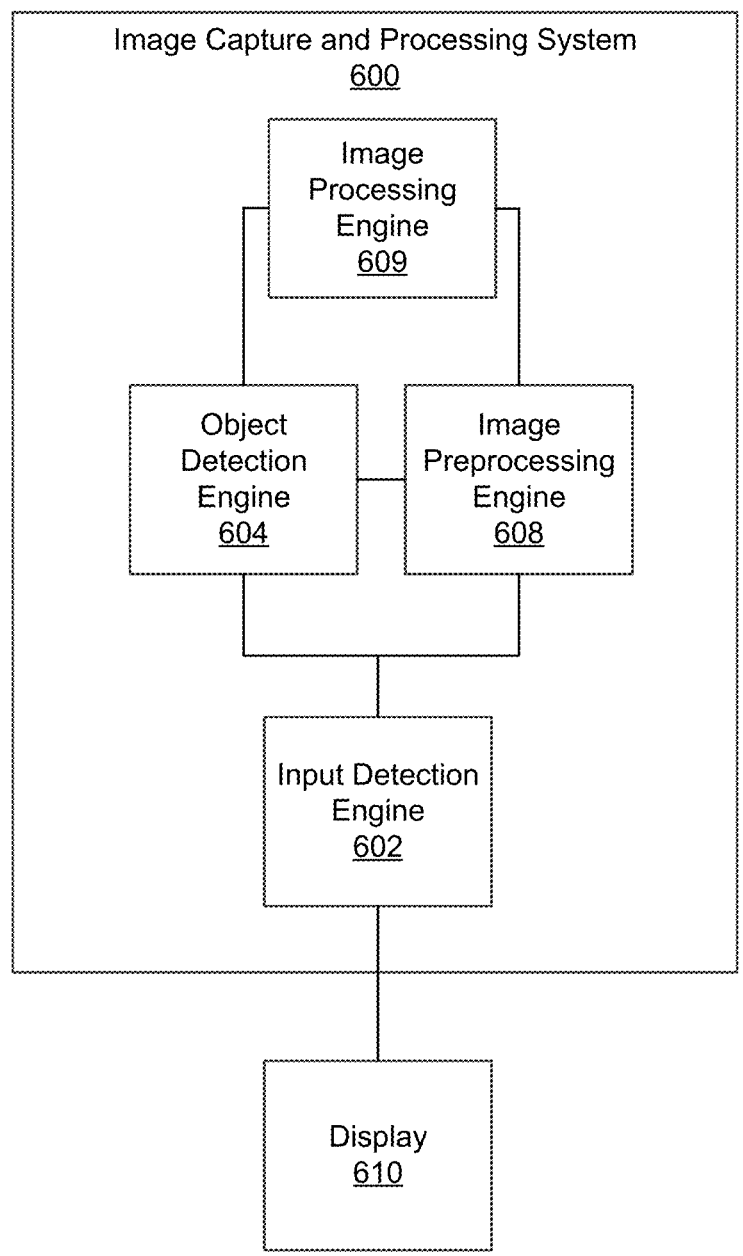
FIG. 6 is a block diagram illustrating an image processing system, in accordance with some examples.

FIG. 6 illustrates a block diagram illustrating an example implementation of an image capture and processing system 600 within a device. In some cases, all or a portion of the components of the image capture and processing system 600 may be implemented within a computing device. The device can include any suitable device, such as a mobile device (e.g., a mobile phone), a desktop computing device, a tablet computing device, an extended reality (XR) device (e.g., a virtual reality (VR) headset, an augmented reality (AR) headset, AR glasses, or other XR device), a wearable device (e.g., a network-connected watch or smartwatch, or other wearable device), a server computer, a vehicle (e.g., an autonomous or semi-autonomous vehicle) or computing device of an autonomous vehicle, a robotic device, a television, and/or any other computing device with the resource capabilities to perform the image processing operations described herein.

The image capture and processing system 600 includes an input detection engine 602, an object detection engine 604, an image preprocessing engine 608, an image processing engine 609, and a display 610. The engines of the image capture and processing system 600 may be implemented within various hardware and/or software components of the device. In one example, the input detection engine 602 may reside within a device application layer. The device application layer may represent a portion and/or interface of a camera application that controls the output of the display 610 of the image capture and processing system 600. In some cases, the input detection engine 602 may monitor user input provided to the display 610 while operating within or as part of the device application layer. In an illustrative example, the input detection engine 602 may detect and/or receive a notification (e.g., a "touch flag") indicating that the user has provided user input (e.g., by touching or clicking on the display 610) selecting a particular location or region of the display 610.

The input detection engine 602 may send an indication of this input (e.g., an indication of the selected location) to the object detection engine 604 and/or the image preprocessing engine 608. In some cases, the object detection engine 604 and/or the image preprocessing engine 608 can be part of an image processing application. The image processing application may include any type or form of application configured to perform one or more image processing operations on image data of an image frame captured by the device. In some cases, the input detection engine 602 may also send, to the object detection engine 604 and/or the image preprocessing engine 608, information associated with the selected location, which can be used for object detection. For example, the information associated with the selected location can include an identification of the location of the input selection. In another example, the information can include information associated with a region of interest (ROI) surrounding the selected location that be used for object detection. In some cases, the information associated with the ROI can include a bounding region (e.g., a bounding box, a bounding circle, a bounding ellipse, or other bounding region) representing the ROI, location information identifying a location of the ROI in the image frame, a size of the ROI, and/or other information associated with the ROI.

The object detection engine 604 or the image processing engine 608 can estimate a shooting angle used to capture the image frame. The image preprocessing engine 608 can then perform one or more image preprocessing operations on the image data of the image frame, such as image data within the ROI, using the shooting angle and orientation information associated with capture of the image frame. For example, the device may include an orientation sensor (e.g., the orientation sensor 406 of FIG. 4) that can provide the orientation information to the image preprocessing engine 608. The one or more image preprocessing operations can include a rotation transform or warping method, a perspective transform or warping method, a hybrid transform or warping method that includes rotation and perspective transforms, any combination thereof, and/or other operation(s). Based on performing the one or more image preprocessing operations on the image data, the image preprocessing engine 608 can generate a modified image frame. Examples are described below with respect to FIG. 7A, FIG. 7B, FIG. 7C, FIG. 7D, FIG. 7E, FIG. 7F, among others.

The image preprocessing engine 608 can provide the modified image frame (after the one or more image preprocessing operations are performed on the initial image frame processed by the image preprocessing engine 608) to the object detection engine 604. The object detection engine 604 can utilize the information output from the input detection engine 602 (e.g., the ROI and in some cases the size of the ROI) to detect one or more objects within the ROI in the modified image frame.

The object detection engine 604 can provide an output (e.g., the ROI or location information indicating a location of the ROI in the image frame) to an image processing engine 609. In some cases, the image processing engine 609 can be similar to and can perform operations similar to those of the image processor 150 of the image capture and processing system 100 of FIG. 1. In an illustrative example, the image processor 150 can perform one or more image processing operations on a ROI of the image frame, such as a 3A operation (e.g., an auto-focus algorithm, an auto-exposure algorithm, and/or an auto-white-balance algorithm), an auto-zoom operation, or other operation.

Figure 7A:
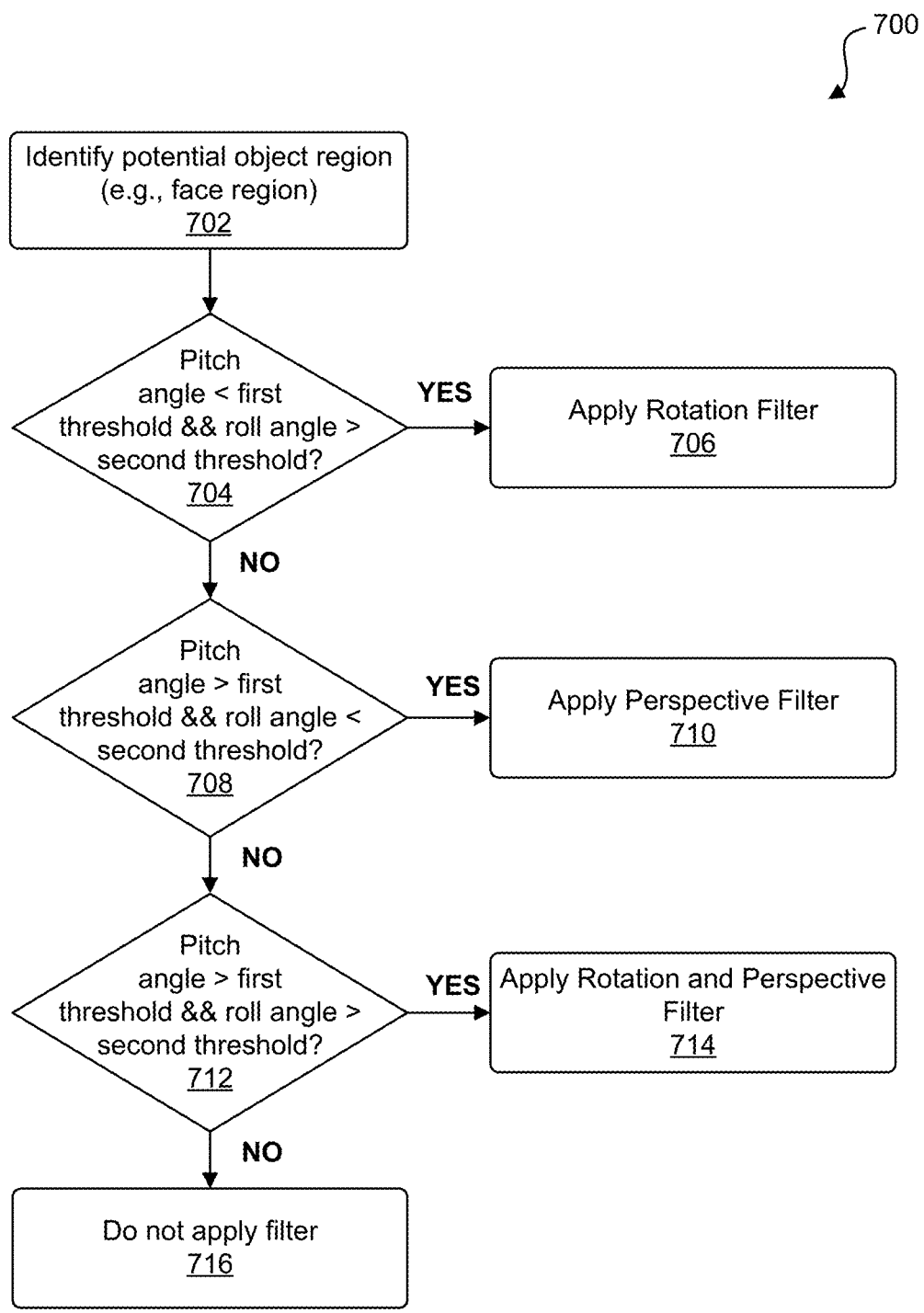
FIG. 7A, FIG. 7B, FIG. 7C, FIG. 7D, FIG. 7E, and FIG. 7F are diagrams illustrating an example of processes for preprocessing an image before object detection, in accordance with some examples.

FIG. 7A is a flow diagram illustrating an example process 700 for improving one or more image processing operations on image frames. FIG. 7B, FIG. 7C, FIG. 7D, and FIG. 7E illustrate aspects of the process 700 for improving one or more image processing operations in image frames. For the sake of clarity, the process 700 is described with references to the image capture and processing system 600 shown in FIG. 6. The steps outlined herein are examples and can be implemented in any combination thereof, including combinations that exclude, add, or modify certain steps.

Figure 7B:
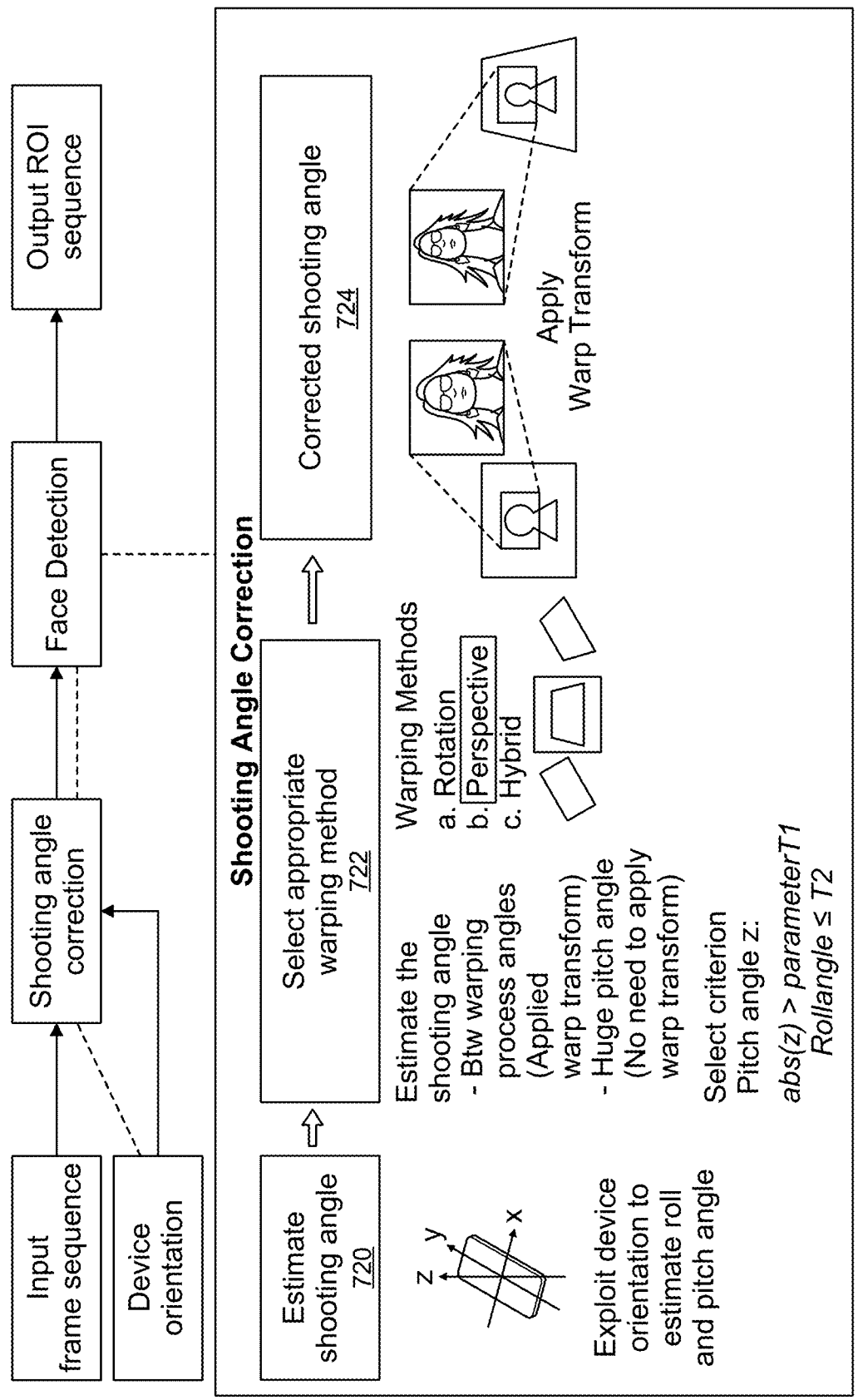
Figure 7C:
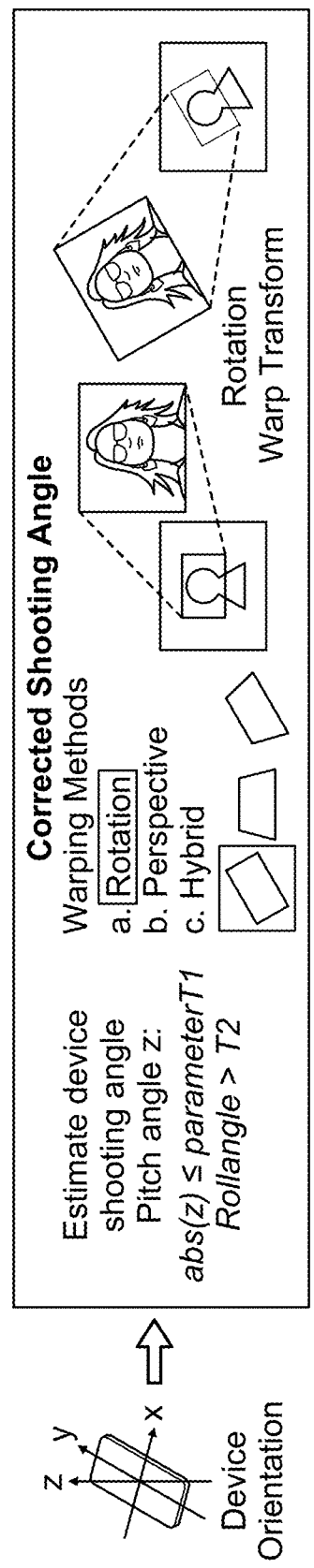
Figure 7D:
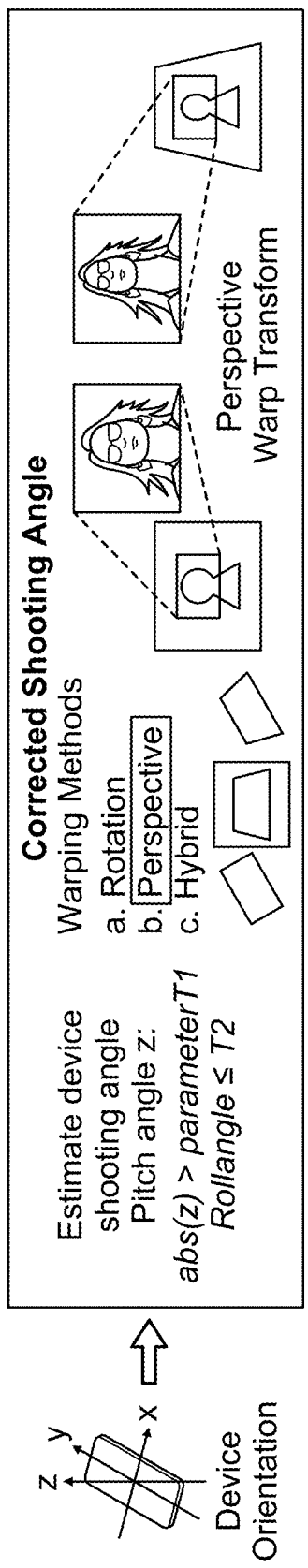
Figure 7E:
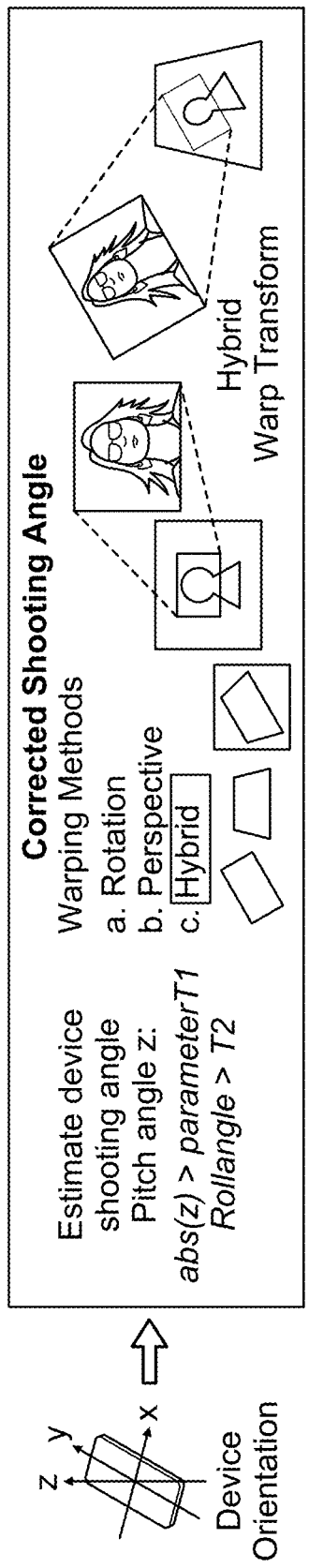
Figure 7F:
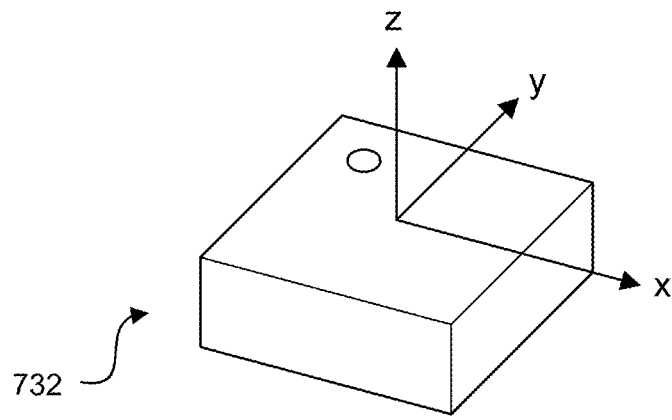
Figure 7F:
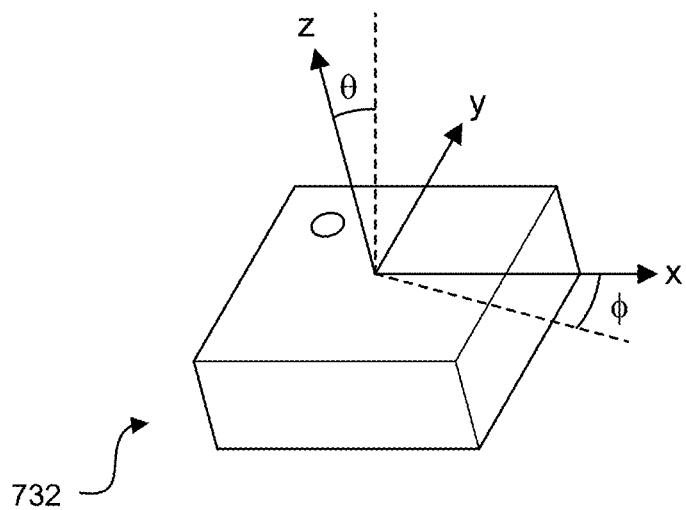

For instance, as illustrated in FIG. 7A-FIG. 7F, the image capture and processing system 600 can perform angle correction techniques (e.g., before performing image processing operations, such as face detection by the object detection engine 604). The angle correction techniques can include at least three operations or schemes, including estimating shooting angle of the input frame (e.g., block 720 of FIG. 7B), selecting an appropriate warping (or transform) method (e.g., block 722 of FIG. 7B), and correcting the shooting angle (e.g., block 724 of FIG. 7B). With respect to estimating the shooting angle, a sensor (e.g., a gravity sensor such as an accelerometer, a gyroscope, or other sensor) can provide an acceleration force along the X (in a horizontal direction), Y (in a vertical direction), and Z (in a depth direction) axes (corresponding to a translation of the device used to capture the image). The roll and pitch angles between the device and an object in the image can be estimated. For example, FIG. 7F illustrates an object 732 with no tilt and the object 732 with an estimated z-tilt angle by a z-axis (in the depth direction. In some examples, the image capture and processing system 600 can estimate the roll and pitch angles between the device and the object using the formula shown in FIG. 7F. For example, the following formula can be used to estimate the roll and pitch angles between the device and the object:

$$(\text{acceleration force})/(\text{maximum acceleration}(9.8\text{m}/\text{s}^2)))$$

In some cases, the image capture and processing system 600 can select the appropriate warping (or transform) method (e.g., at block 722 of FIG. 7B) based on the pitch of the shooting angle. For instance, according to one or more pitch angle criteria, when the pitch angle is smaller or equal to the parameter T1, the systems and techniques can apply a rotation warping transform to determine an inverse of the rotation of the shooting angle. In other examples, the systems and techniques can additionally or alternatively apply a perspective or hybrid warping transform to the input frame. The systems and techniques can then correct the shooting angle (e.g., at block 724 of FIG. 7B) by applying the warping transform. For example, as shown in FIG. 7B, the image capture and processing system 600 can apply a warp transform to correct the shooting angle.

Figure 8A:
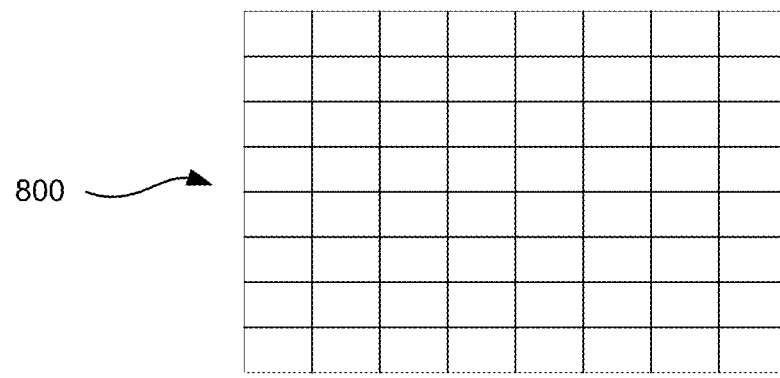
FIG. 8A, FIG. 8B, FIG. 8C, and FIG. 8D are examples of processing techniques for improving one or more image capture operations in image frames, in accordance with some examples.
Figure 8B:
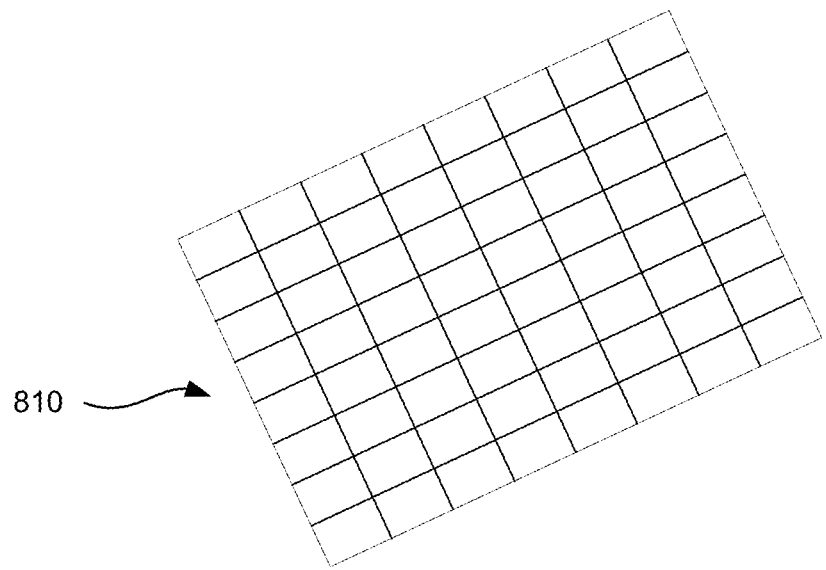

Referring to FIG. 7A, at block 702, the process 700 identifies a potential object region. In one example, the potential object region is a potential face region. At block 704, the process 700 determines if a pitch angle is less than a first threshold (e.g., 25°, 30°, 40°, etc.) and a roll angle is greater than a second threshold (e.g., 0°, 5°, 10°, etc.). If a pitch angle is less than the first threshold and a roll angle is greater than the second threshold, the process 700 determines that the input frame is rotated and applies a rotation transform using a rotation warping method to the frame at block 706. FIG. 7C illustrates an example of selecting a rotation warping method based on a pitch angle being less than a first threshold T1 (e.g., 25°, 30°, 40°, etc.) and a roll angle being greater than a second threshold T2. Referring to FIG. 8A and FIG. 8B, an original frame 800 is input into the process 700. FIG. 8B illustrates a result 810 of the original frame 800 after having been rotated along the roll axis. To apply the rotation transform, the image capture and processing system 600 can compute a two-dimensional rotation of the pixels on an angle of rotation and an angular position of the pixel. The image capture and processing system 600 can apply an inverse of the computed two-dimensional rotation to the pixels.

Figure 8C:
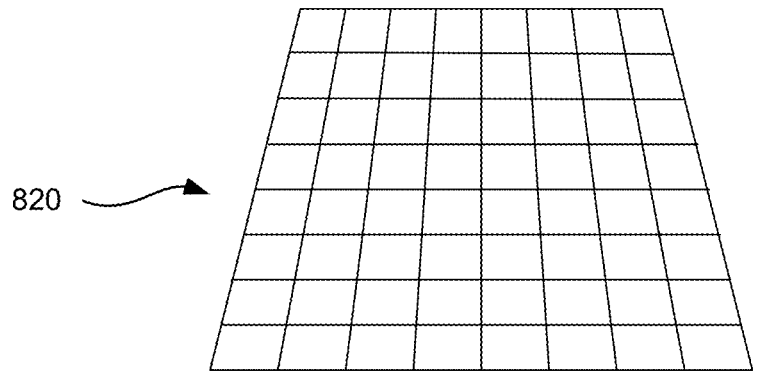

If the rotation transform is not applied to the frame at block 706, the process 700 continues to block 708 and determines if the pitch angle is greater than the first threshold and if the roll angle is less than the second threshold. If the pitch angle is greater than the first threshold and if the roll angle is less than (or equal to in some cases) the second threshold, the process 700 determines that the input frame has a perspective based rotation and applies a perspective transform using a perspective warping method to the frame at block 710. FIG. 7D illustrates an example of selecting a rotation warping method based on the pitch angle being greater than the first threshold T1 and the roll angle being less than or equal to the second threshold T2. Referring to FIG. 8A and FIG. 8C, an original frame 800 is input into the process 700 and FIG. 8C illustrates a result 820 of the original frame 800 after having a perspective transform applied.

Figure 7G:
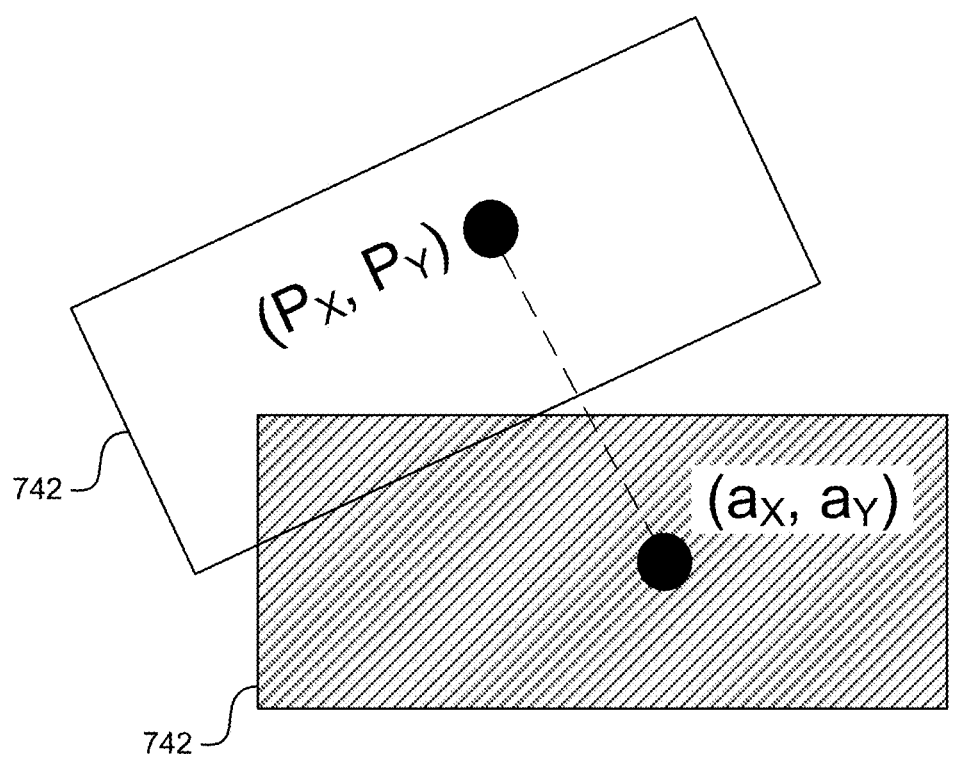
FIG. 7G is an illustration of a perspective transform, in accordance with some examples.

In some cases, the perspective warping transform can be expressed as an equation in terms of rotations about the x, y, and z axes. One illustrative example of a perspective warping transform equation expressed in terms of rotations about the x, y, and z axes is as follows:

$$\begin{bmatrix} dx \\ dy \\ dz \end{bmatrix} = \begin{bmatrix} 1 & 0 & 0 \\ 0 & \cos(\theta x) & \sin(\theta x) \\ 0 & -\sin(\theta x) & \cos(\theta x) \end{bmatrix} \begin{bmatrix} \cos(\theta y) & 0 & -\sin(\theta y) \\ 0 & 1 & 0 \\ \sin(\theta y) & 0 & \cos(\theta y) \end{bmatrix}$$

$$\begin{bmatrix} \cos(\theta z) & \sin(\theta z) & 0 \\ -\sin(\theta z) & \cos(\theta z) & 0 \\ 0 & 0 & 1 \end{bmatrix} \begin{bmatrix} ax \\ ay \\ 1 \end{bmatrix}$$

Where ax and ay represent the original coordinate and dx, dy, and dz represent the transformed coordinate. The final coordinate can be given as Px=dx/dz, Py=dx/dz. FIG. 7G provides an illustration of the perspective transform. For example, an object 742 is rotated from an original position with original coordinate ax and ay to a modified or transformed position with a final coordinate Px and Py.

Figure 8D:
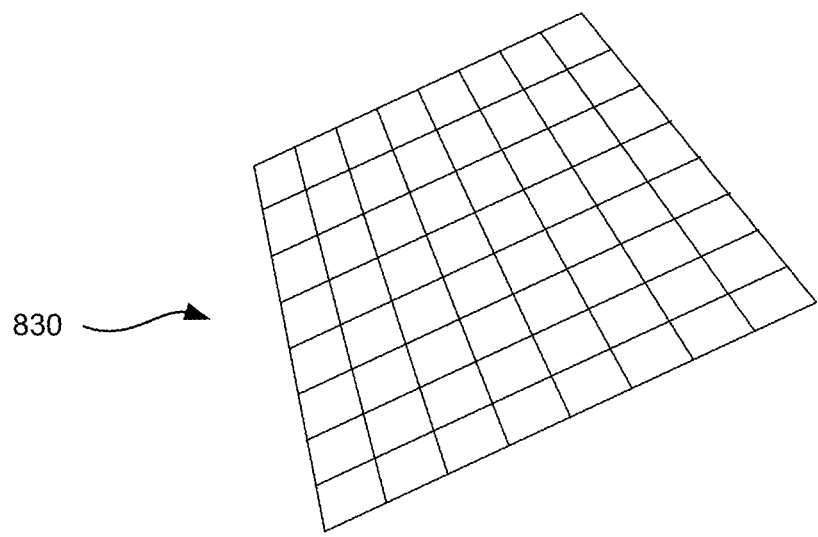

If the perspective transform is not applied at block 710, the process 700 continues to block 708 and determines if the pitch angle is greater than the first threshold and if the roll angle is greater than the second threshold. When the pitch angle is greater than the first threshold and the roll angle is greater than the second threshold, the process determines that the input frame has a perspective and a rotation and applies both rotation and perspective transforms. FIG. 7E illustrates an example of selecting a hybrid warping method (e.g., including the rotation warping method and the perspective warping method) based on the pitch angle being greater than the first threshold T1 and the roll angle being greater than the second threshold T2. Referring to FIG. 8A and FIG. 8D, an original frame 800 is input into the process 700 and FIG. 8D illustrates a result 830 of the original frame 800 after having both a rotation and perspective transform applied.

If the pitch angle is less than the first threshold and the roll angle is less than the second threshold, the process 700 determines that post-processing is not required and does not apply a transform at block 716.

In some examples, the process 700 normalizes features of a detected object (e.g., facial features, such as the eyes, nose, mouth, etc.) to align the object with a natural position (e.g., to align the user with a natural position). Such normalization can reduce the complexity of the face detection algorithm by removing different positions that the object (e.g., face) could be in, which improves the stability of the object detection algorithm (e.g., face detection algorithm).

While the operations of blocks 704, 706, 708, 710, 712, and 714 in FIG. 7A are shown in a particular order, the operations can be performed in any order. For example, the process 700 may first determine if the pitch angle is greater than the first threshold and if the roll angle is less than the second threshold to determine whether to perform the perspective filter before determining if the pitch angle is less than the first threshold and if the roll angle is greater than the second threshold to determine whether to apply the rotation filter.

Figure 9A:
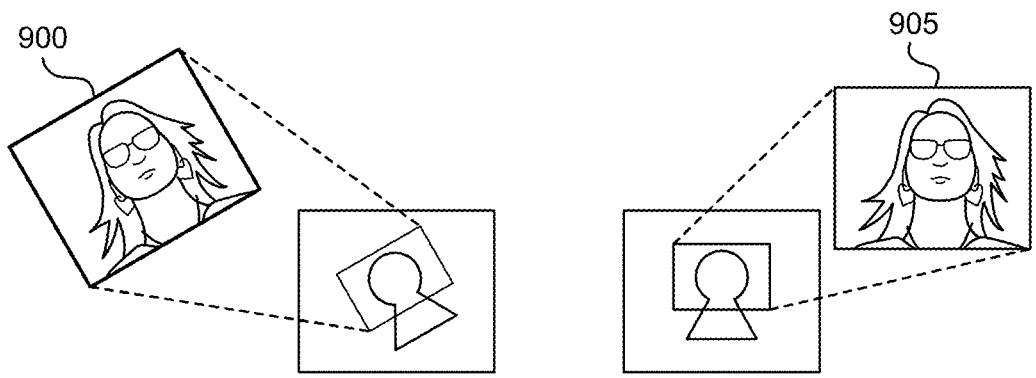
FIG. 9A, FIG. 9B, and FIG. 9C are illustrations of improved image capture operations, in accordance with some examples.
Figure 9B:
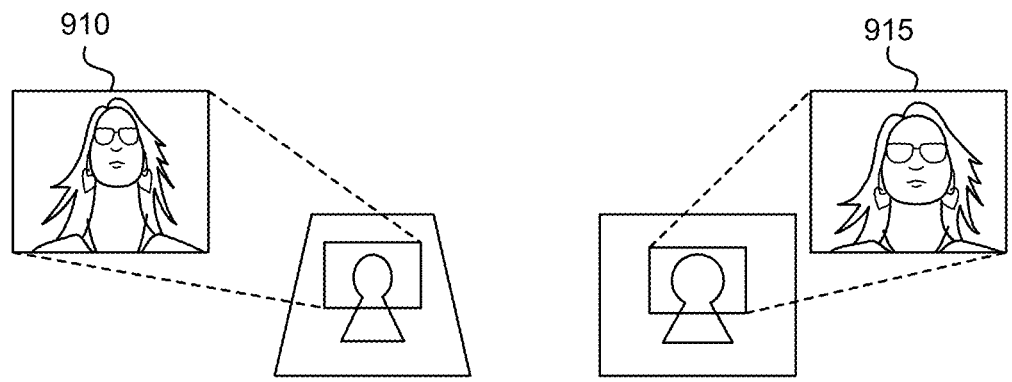
Figure 9C:
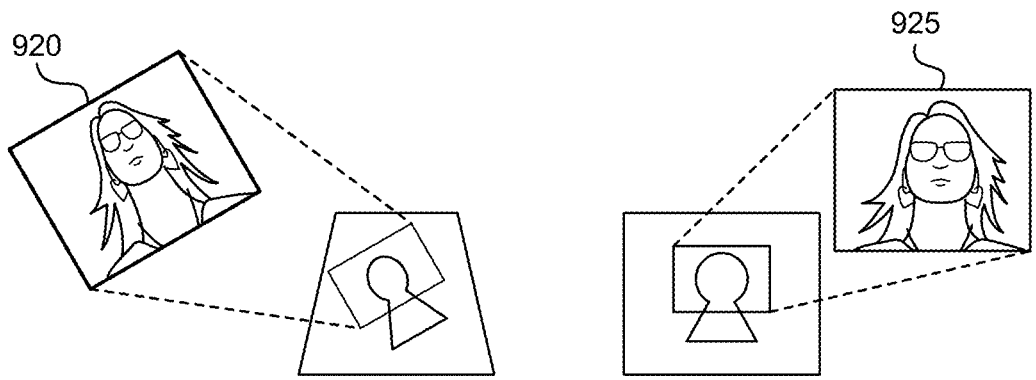

FIG. 9A, FIG. 9B, and FIG. 9C include images illustrating the improvements provided by the disclosed image processing techniques and solutions. Specifically, FIG. 9A illustrates an example frame 900 that is rotating along a roll axis. A portion of the frame 900 is extracted and transformed to correct the rotation, which yields frame 905. Because the person's face is not rotated and correctly aligned with natural position in frame 905, the face detection algorithm can more accurately identify the face region from frame 905 and correctly identify the ROI for the "3A" operations.

FIG. 9B illustrates an example frame 910 that is rotated along a pitch axis. A portion of the frame 910 is extracted and transformed to correct the pitch, which yields frame 915. Because the person's face is not skewed by a perspective difference in frame 915, the face detection algorithm can more accurately identify the face region from frame 915 and correctly identify the ROI for the "3A" operations.

FIG. 9C illustrates an example frame 920 that is rotated along a roll axis and a pitch axis. A portion of the frame 920 is extracted and transformed to correct the roll and pitch of frame 920, which yields frame 925. Because the person's face is not skewed and rotated, the face detection algorithm can more accurately identify the face region from frame 925 and correctly identify the ROI for the "3A" operations.

Figure 10:
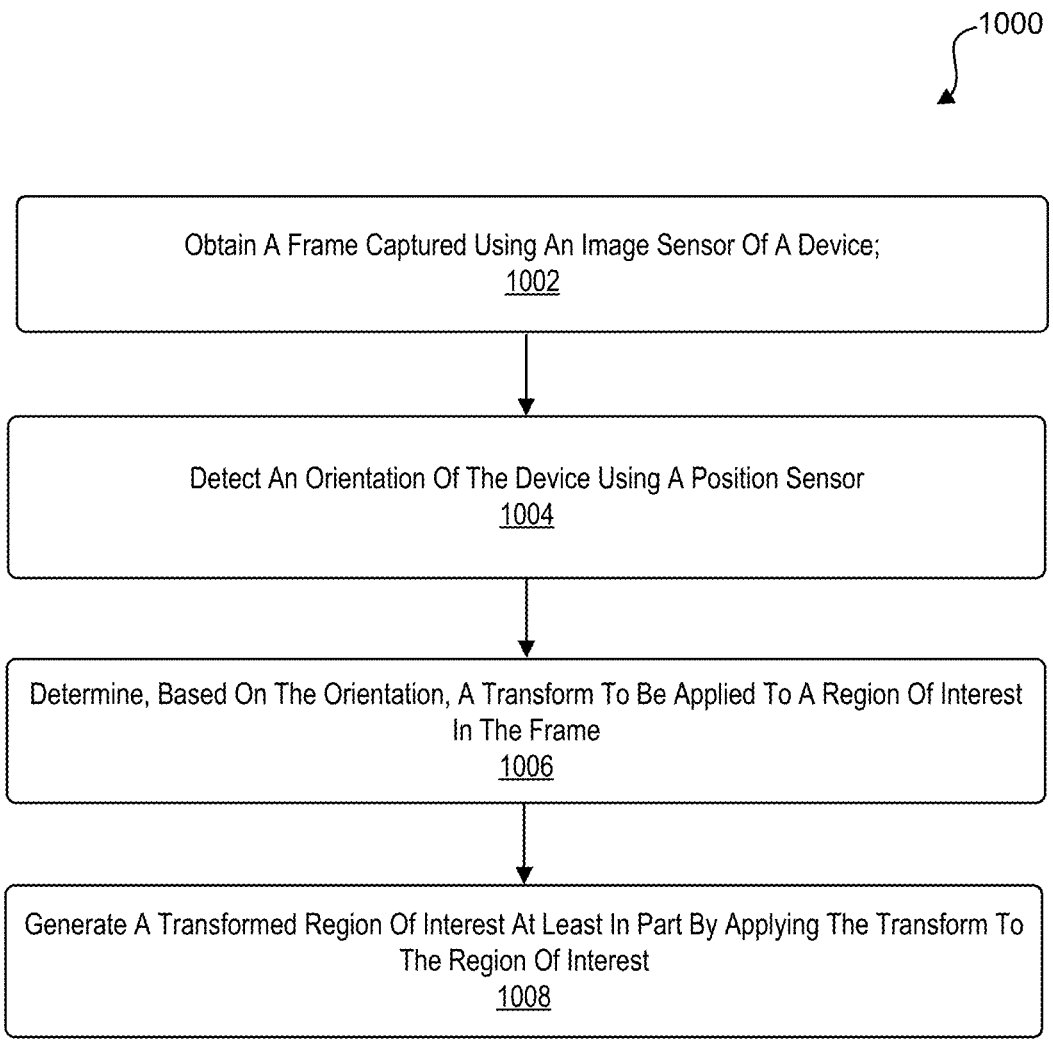
FIG. 10 is a flow diagram illustrating an example of a process for improving one or more image capture operations in image frames, in accordance with some examples.

FIG. 10 is a flow diagram illustrating an example of a process 1000 for processing image data using one or more of the techniques described herein. At block 1002, the process 1000 includes obtaining a frame (e.g., of a sequence of frames) captured using an image sensor of a device. In some cases, the process 1000 can include capturing the frame (e.g., when a device or apparatus performing the process 1000 includes the image sensor). In some cases, the process 100 can receive the frame (e.g., when a device or apparatus performing the process 1000 is separate from another device or apparatus that includes the image sensor).

At block 1004, the process 1000 includes detecting an orientation of the device using a position sensor. In some aspects, to detect the orientation of the device using the position sensor, the process 1000 can include identifying a point of interest in the frame. The process 1000 can include detecting a first rotation on a pitch axis based on a difference between the point of interest and a pitch of the device. The process 1000 can further include detecting a second rotation on a roll axis based on a difference between the point of interest and a rotation of the device. In one illustrative example, the position sensor comprises an accelerometer. In another illustrative example, the position sensor comprises a gyroscope. In another illustrative example, the position sensor includes multiple position sensors, such as an accelerometer and a gyroscope.

At block 1006, the process 1000 includes determining, based on the orientation, a transform to be applied to a region of interest in the frame. In some aspects, the region of interest in the frame corresponds to an object (e.g., a face, a vehicle, or other object). In some examples, the transform is determined to be applied to the region of interest when at least one of the first rotation on the pitch axis is greater than a first threshold value from a pitch axis origin and when the second rotation on the roll axis is greater than a second threshold value from a roll axis origin. In one illustrative example, when the first rotation on the pitch axis is greater than the first threshold value from the pitch axis origin and the second rotation on the roll axis is less than the second threshold value from the roll axis origin, the transform includes a perspective transform of at least the region of interest in the frame. In another illustrative example, when the first rotation on the pitch axis is less than the first threshold value from the pitch axis origin and the second rotation on the roll axis is greater than the second threshold value from the roll axis origin, the transform includes a rotation of at least the region of interest in the frame. In another illustrative example, when the first rotation on the pitch axis is greater than the first threshold value from the pitch axis origin and the second rotation on the roll axis is greater than the second threshold value from the roll axis origin, the transform includes a rotation of at least the region of interest in the frame and a perspective transform of at least the region of interest in the frame. The first and second thresholds can be set to any suitable value(s). In one example, the first threshold value from the pitch axis origin comprises 30 degrees. In another example, the second threshold value from the roll axis origin comprises 5 degrees. The first and second threshold values can be set to any other suitable values.

At block 1008, the process 1000 includes generating a transformed region of interest at least in part by applying the transform to the region of interest. In some aspects, the process 1000 can include identifying the region of interest for identification of an object (e.g., a face, a vehicle, or other object). For example, in some cases, the process 1000 can include performing object detection using the transformed region of interest. In some examples, the process 1000 can include providing (e.g., transmitting, sending, or otherwise outputting) the transformed region of interest to the object detection engine 408 or object detection engine 604, which can implement an object detection algorithm. The process 1000 can include detecting the object based on performing the object detection using the transformed region of interest.

As noted above, in one illustrative example, the region of interest includes a facial region. In such an example, performing the object detection includes performing face detection to identify a face in the transformed region of interest.

In another illustrative example, the region of interest comprises a vehicle and performing the object detection includes identifying or detecting a vehicle. Any other object and corresponding object detection algorithm can be used by the process 1000.

In some examples, the process 1000 can provide (e.g., transmitting, sending, or otherwise outputting) the transformed region of interest to the image processing engine 609, which can perform one or more image processing algorithms or operations (e.g., auto-exposure, auto-focus, auto-white-balance, auto-zoom, and/or other algorithm or operation). In cases where the transformed region of interest is output to the object detection algorithm, the process 1000 can include detecting the object based on the object detection using the transformed region of interest. In some examples, the process 1000 can include performing at least one of auto-exposure, auto-focus, and auto-white-balance on the region of interest of the frame.

In some examples, the processes described herein (e.g., process 700, process 1000 and/or other process described herein) may be performed by a computing device or apparatus (e.g., the device shown in FIG. 6). In one example, the process 700 and/or the process 1000 can be performed by the image capture and processing system 600. In another example, the process 700 and/or the process 1000 can be performed by a computing device with the computing system 1200 shown in FIG. 12. For instance, a computing device with the computing architecture shown in FIG. 12 can include the components of the image capture and processing system 600 and can implement the operations of FIG. 7A and FIG. 10.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 1000. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 700 and the process 1000 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700, the process 1000, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
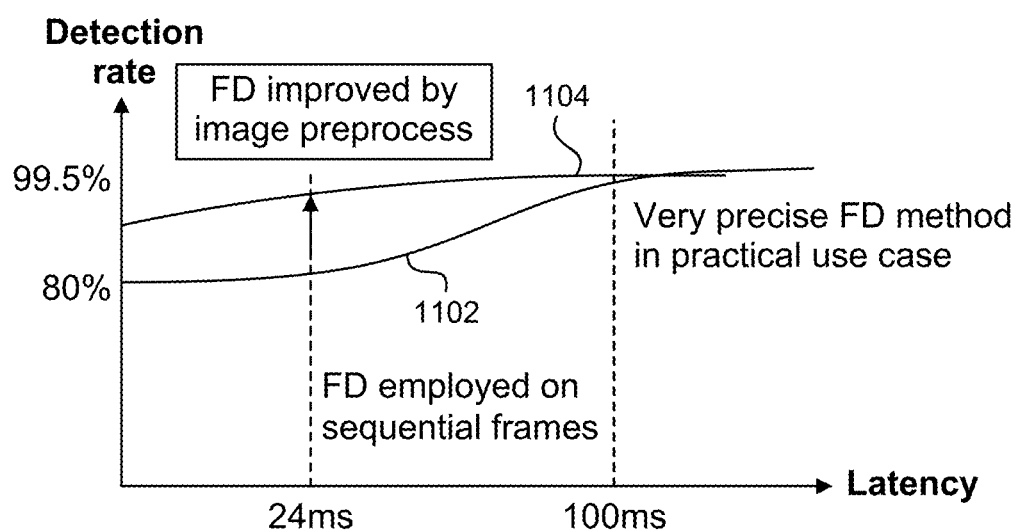
FIG. 11 is a graph illustrating an improvement in objection detection, in accordance with some examples.

FIG. 11 illustrates a graph illustrating an improvement in objection detection based on the disclosed systems and methods. Specifically, the X axis in FIG. 11 illustrates a latency based on computational complexity and the Y axis illustrates face detection accuracy. Line 1102 illustrates conventional face detection accuracy with respect to latency. As illustrated by line 1102, face detection is unstable at low latency (e.g., low complexity) and can maintain stable face detection at high latency (e.g., high complexity). High latency increases camera operation time and is undesirable. Line 1104 illustrates face detection accuracy with respect to latency when the disclosed systems and method are implemented.

Figure 12:
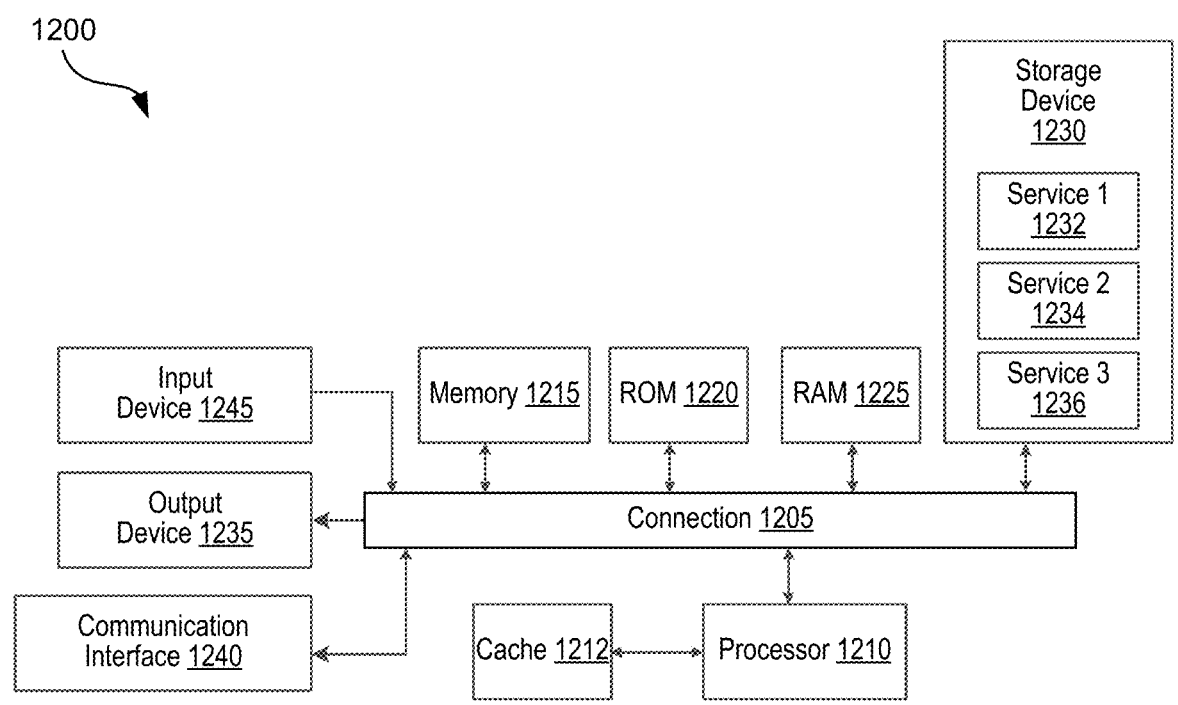
FIG. 12 is a diagram illustrating an example of a system for implementing certain aspects described herein

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/Re-RAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the present disclosure include, but are not limited to, the following aspects:

Aspect 1: A method of processing image data, comprising: obtaining a frame captured using an image sensor of a device; detecting an orientation of the device using a position sensor; determining, based on the orientation, a transform to be applied to a region of interest in the frame; generating a transformed region of interest at least in part by applying the transform to the region of interest. In some cases, the method includes performing object detection using the transformed region of interest.

Aspect 2: The method of aspect 1, wherein the region of interest comprises a facial region and performing the object detection includes performing face detection to identify a face in the transformed region of interest.

Aspect 3: The method of any one of aspects 1 or 2, wherein detecting the orientation of the device using the position sensor comprises: identifying a point of interest in the frame; detecting a first rotation on a pitch axis based on a difference between the point of interest and a pitch of the device; and detecting a second rotation on a roll axis based on a difference between the point of interest and a rotation of the device.

Aspect 4: The method of aspect 3, wherein the transform is determined to be applied to the region of interest when at least one of the first rotation on the pitch axis is greater than a first threshold value from a pitch axis origin and when the second rotation on the roll axis is greater than a second threshold value from a roll axis origin.

Aspect 5: The method of aspect 4, wherein, when the first rotation on the pitch axis is greater than the first threshold value and the second rotation on the roll axis is less than the second threshold value, the transform includes a perspective transform of at least the region of interest in the frame.

Aspect 6: The method of aspect 4, wherein, when the first rotation on the pitch axis is less than the first threshold value and the second rotation on the roll axis is greater than the second threshold value, the transform includes a rotation of at least the region of interest in the frame.

Aspect 7: The method of aspect 4, wherein, when the first rotation on the pitch axis is greater than the first threshold value and the second rotation on the roll axis is greater than the second threshold value, the transform includes a rotation of at least the region of interest in the frame and a perspective transform of at least the region of interest in the frame.

Aspect 8: The method of any one of aspects 4 to 7, wherein the first threshold value comprises 30 degrees.

Aspect 9: The method of any one of aspects 4 to 8, wherein the second threshold value comprises 5 degrees.

Aspect 10: The method of any one of aspects 1 to 9, wherein the region of interest in the frame corresponds to an object.

Aspect 11: The method of any one of aspects 1 to 10, further comprising detecting the object based on performing the object detection using the transformed region of interest.

Aspect 12: The method of any one of aspects 1 to 11, further comprising performing at least one of auto-exposure, auto-focus, and auto-white-balance on the region of interest of the frame.

Aspect 13: The method of any one of aspects 1 to 12, wherein the position sensor comprises an accelerometer.

Aspect 14: The method of any one of aspects 1 to 13, wherein the position sensor comprises a gyroscope.

Aspect 15: The method of any one of aspects 1 to 14, further comprising identifying the region of interest for identification of an object.

Aspect 16: An apparatus for processing image data, comprising: at least one memory; and at least one processor coupled to the at least one memory, the at least one processor configured to: obtain a frame captured using an image sensor of a device; detect an orientation of the device using a position sensor; determine, based on the orientation, a transform to be applied to a region of interest in the frame; generate a transformed region of interest at least in part by applying the transform to the region of interest; and perform object detection using the transformed region of interest.

Aspect 17: The apparatus of aspect 16, wherein the region of interest comprises a facial region and wherein, to perform the object detection, the at least one processor is configured to perform face detection to identify a face in the transformed region of interest.

Aspect 18: The apparatus of any one of aspects 16 or 17, wherein, to detect the orientation of the device using the position sensor, the at least one processor is configured to: identify a point of interest in the frame; detect a first rotation on a pitch axis based on a difference between the point of interest and a pitch of the device; and detect a second rotation on a roll axis based on a difference between the point of interest and a rotation of the device.

Aspect 19: The apparatus of aspect 18, wherein the at least one processor is configured to apply the transform to the region of interest when at least one of the first rotation on the pitch axis is greater than a first threshold value from a pitch axis origin and when the second rotation on the roll axis is greater than a second threshold value from a roll axis origin.

Aspect 20: The apparatus of aspect 19, wherein, when the first rotation on the pitch axis is greater than the first threshold value and the second rotation on the roll axis is less than the second threshold value, the transform includes a perspective transform of at least the region of interest in the frame.

Aspect 21: The apparatus of aspect 19, wherein, when the first rotation on the pitch axis is less than the first threshold value and the second rotation on the roll axis is greater than the second threshold value, the transform includes a rotation of at least the region of interest in the frame.

Aspect 22: The apparatus of aspect 19, wherein, when the first rotation on the pitch axis is greater than the first threshold value and the second rotation on the roll axis is greater than the second threshold value, the transform includes a rotation of at least the region of interest in the frame and a perspective transform of at least the region of interest in the frame.

Aspect 23: The apparatus of any one of aspects 19 to 22, wherein the first threshold value comprises 30 degrees.

Aspect 24: The apparatus of any one of aspects 19 to 23, wherein the second threshold value comprises 5 degrees.

Aspect 25: The apparatus of any one of aspects 16 to 24, wherein the region of interest in the frame corresponds to an object.

Aspect 26: The apparatus of any one of aspects 16 to 25, wherein the at least one processor is configured to detect the object based on performing the object detection using the transformed region of interest.

Aspect 27: The apparatus of any one of aspects 16 to 26, wherein the at least one processor is configured to perform at least one of auto-exposure, auto-focus, and auto-white-balance on the region of interest of the frame.

Aspect 28: The apparatus of any one of aspects 16 to 27, wherein the position sensor comprises an accelerometer.

Aspect 29: The apparatus of any one of aspects 16 to 28, wherein the position sensor comprises a gyroscope.

Aspect 30: The apparatus of any one of aspects 16 to 29, wherein the at least one processor is configured to identify the region of interest for identification of an object.

Aspect 31: The apparatus of any one of aspects 16 to 30, further comprising the image sensor.

Aspect 32: The apparatus of any one of aspects 16 to 31, wherein the apparatus is the device.

Aspect 33: The apparatus of any one of aspects 16 to 31, wherein the apparatus is part of the device.

Aspect 34: The apparatus of any one of aspects 16 to 33, wherein the apparatus is separate from the device, and wherein the at least one processor is configured to: receive the frame from the device.

Aspect 35: A non-transitory computer-readable storage medium comprising instructions stored thereon which, when executed by one or more processors, cause the one or more processors to perform operations of any of aspects 1 to 34.

Aspect 36: An apparatus for processing image data, the apparatus comprising means for performing operations of any of aspects 1 to 34.

What is claimed is:

1. A method of processing image data, comprising:
    obtaining a frame captured using an image sensor of a device;
    detecting, using a position sensor, an orientation of the device associated with a shooting angle of the image sensor used to capture the frame;
    determining, based on the orientation, a transform to be applied to pixels of a region of interest in the frame for adjusting the shooting angle;
    generating a transformed region of interest at least in part by applying the transform to the pixels of the region of interest to adjust the shooting angle; and
    performing object detection using the transformed region of interest.

2. The method of claim 1, wherein the region of interest comprises a facial region and performing the object detection includes performing face detection to identify a face in the transformed region of interest.

3. The method of claim 1, wherein detecting the orientation of the device using the position sensor comprises:
    identifying a point of interest in the frame;
    detecting a first rotation on a pitch axis based on a difference between the point of interest and a pitch of the device; and
    detecting a second rotation on a roll axis based on a difference between the point of interest and a rotation of the device.

4. The method of claim 3, wherein the transform is determined to be applied to the region of interest when at least one of the first rotation on the pitch axis is greater than a first threshold value from a pitch axis origin or when the second rotation on the roll axis is greater than a second threshold value from a roll axis origin.

5. The method of claim 4, wherein, when the first rotation on the pitch axis is greater than the first threshold value and the second rotation on the roll axis is less than the second threshold value, the transform includes a perspective transform of at least the region of interest in the frame.

6. The method of claim 4, wherein the first rotation on the pitch axis is less than the first threshold value and the second rotation on the roll axis is greater than the second threshold value, the transform includes a rotation of at least the region of interest in the frame.

7. The method of claim 4, wherein, when the first rotation on the pitch axis is greater than the first threshold value and the second rotation on the roll axis is greater than the second threshold value, the transform includes a rotation of at least the region of interest in the frame and a perspective transform of at least the region of interest in the frame.

8. The method of claim 4, wherein the first threshold value comprises 30 degrees and the second threshold value comprises 5 degrees.

9. The method of claim 1, further comprising detecting an object based on performing the object detection using the transformed region of interest.

10. The method of claim 1, further comprising performing at least one of auto-exposure, auto-focus, or auto-white-balance on the transformed region of interest.

11. The method of claim 1, wherein the position sensor comprises an accelerometer.

12. The method of claim 1, wherein the position sensor comprises a gyroscope.

13. The method of claim 1, further comprising identifying the region of interest for identification of an object.

14. The method of claim 1, further comprising capturing the frame using the image sensor.

15. An apparatus for processing image data, comprising:
    at least one memory; and
    at least one processor coupled to the at least one memory, the at least one processor configured to:
        obtain a frame captured using an image sensor of a device;
        detect, using a position sensor, an orientation of the device associated with a shooting angle of the image sensor used to capture the frame using a position sensor;
        determine, based on the orientation, a transform to be applied to pixels of a region of interest in the frame for adjusting the shooting angle;
        generate a transformed region of interest at least in part by applying the transform to the pixels of the region of interest to adjust the shooting angle; and
        performing object detection using the transformed region of interest.

16. The apparatus of claim 15, wherein the region of interest comprises a facial region and wherein, to perform the object detection, the at least one processor is configured to perform face detection to identify a face in the transformed region of interest.

17. The apparatus of claim 15, wherein, to detect the orientation of the device using the position sensor, the at least one processor is configured to:
    identify a point of interest in the frame;
    detect a first rotation on a pitch axis based on a difference between the point of interest and a pitch of the device; and
    detect a second rotation on a roll axis based on a difference between the point of interest and a rotation of the device.

18. The apparatus of claim 17, wherein the at least one processor is configured to apply the transform to the region of interest when at least one of the first rotation on the pitch axis is greater than a first threshold value from a pitch axis origin or when the second rotation on the roll axis is greater than a second threshold value from a roll axis origin.

19. The apparatus of claim 18, wherein, when the first rotation on the pitch axis is greater than the first threshold value and the second rotation on the roll axis is less than the second threshold value, the transform includes a perspective transform of at least the region of interest in the frame.

20. The apparatus of claim 18, wherein, when the first rotation on the pitch axis is less than the first threshold value and the second rotation on the roll axis is greater than the second threshold value, the transform includes a rotation of at least the region of interest in the frame.

21. The apparatus of claim 18, wherein, when the first rotation on the pitch axis is greater than the first threshold value and the second rotation on the roll axis is greater than the second threshold value, the transform includes a rotation of at least the region of interest in the frame and a perspective transform of at least the region of interest in the frame.

22. The apparatus of claim 18, wherein the first threshold value comprises 30 degrees and the second threshold value comprises 5 degrees.

23. The apparatus of claim 15, wherein the at least one processor is configured to detect an object based on performing the object detection using the transformed region of interest.

24. The apparatus of claim 15, wherein the at least one processor is configured to perform at least one of auto-exposure, auto-focus, or auto-white-balance on the transformed region of interest.

25. The apparatus of claim 15, wherein the position sensor comprises an accelerometer.

26. The apparatus of claim 15, wherein the position sensor comprises a gyroscope.

27. The apparatus of claim 15, wherein the at least one processor is configured to identify the region of interest for identification of an object.

28. The apparatus of claim 15, further comprising the image sensor.

29. The apparatus of claim 15, wherein the apparatus is the device.

30. The apparatus of claim 15, wherein the apparatus is separate from the device, and wherein the at least one processor is configured to:

receive the frame from the device.

* * * * *